Aug. 28, 1934.    W. J. ANDRES    1,971,594
BRAKE
Filed Dec. 16, 1931

INVENTOR.
WILLIAM J. ANDRES
BY
ATTORNEY.

Patented Aug. 28, 1934

1,971,594

UNITED STATES PATENT OFFICE 1,971,594

BRAKE

William J. Andres, South Bend, Ind., assignor to Bendix Aviation Corporation, South Bend, Ind., a corporation of Delaware Application December 16, 1931, Serial No. 581,455

4 Claims. (Cl. 188—79.5)

This invention relates to brakes, and more particularly to internal expanding brakes.

Broadly, the invention comprehends means for applying the friction element of an internal expanding brake including a toggle connected between the separable ends of the friction element, together with means for guiding the movement of the toggle and also for taking the torque of the brake.

In a preferred embodiment of the invention there is shown a fixed support which may be secured to the flange of a swiveling knuckle. The support has a rectangular portion positioned between the separable ends of a friction element, and connected between the separable ends of the friction element is a toggle, the knee of which is positioned in the rectangular portion of the fixed support, and pivotally connected to the knee is an operating lever controlled through a cable extending through the pivot of the swiveling knuckle. The arms of the toggle have lugs connected by suitable return springs to the fixed support.

The articulated ends of the shoes are shown connected by a unique adjusting device affording means for adjusting the over-all length of the friction element to compensate for wear, the structure and the arrangement of this device being such that it is self-locking.

An object of the invention is to provide a brake structure including a friction element and means for moving the element bodily into drum engagement by moving its anchor radially and thereby increasing the effectiveness of the brake.

Another object of the invention is to provide a self-locking adjusting device for the friction elements of the brake.

A feature of the invention is an operating means which also functions as the anchor for the friction element.

Another feature of the invention is a combined operating and anchoring means actuated through a cable extending through the pivot pin supporting the knuckle to which the brake is attached.

And yet another feature of the invention is an adjusting member for the articulated ends of the shoes including means for locking the member against displacement.

Other objects and features of the invention will appear from the following description taken in connection with the drawing, which forms a part of this specification, and in which.

Figures 1, 2, 3, 4:
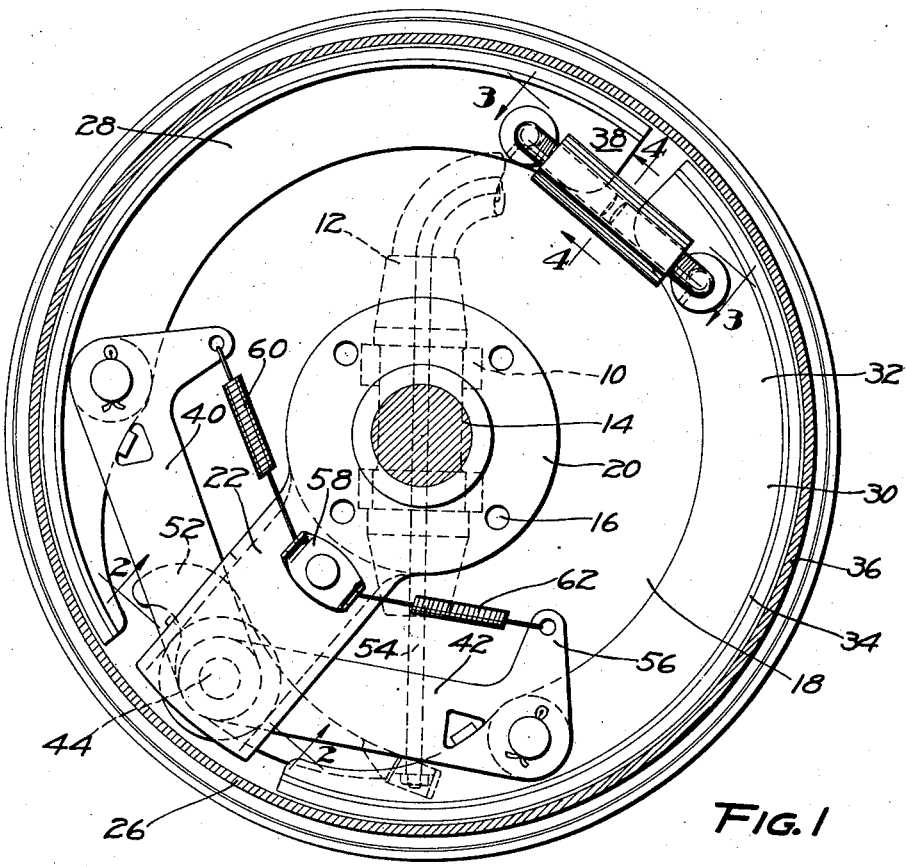
Figure 1 is a vertical sectional view of a brake illustrating the friction elements in side elevation and showing the invention as applied.
Figure 2 is a sectional view substantially on line 2—2, Figure 1.
Figure 3 is a sectional view substantially on line 3—3, Figure 1.
Figure 4 is a sectional view substantially on line 4—4, Figure 1.

Referring to the drawing for more specific details of the invention, 10 represents an eye on the end of an axle, not shown. The eye has positioned therein a pivot pin 12 supporting a knuckle 14 having the conventional flange. Secured to the flange as by bolts 16 is a backing plate 18 and a fixed support 20 having a radial arm 22. As shown, the arm 22 has a hollow rectangular portion 24.

The backing plate 18 and the fixed support 20 have associated therewith a rotatable drum 26 which may be secured to a wheel, not shown, and positioned on the backing plate for cooperation with the drum is a friction element including interchangeable shoes 28 and 30. As shown, each shoe comprises a web 32 supporting a rim 34 to which is suitably secured a friction lining 36. The articulated ends of the shoes are connected by a suitable adjusting device indicated generally at 38 and to be hereinafter explained.

The operable ends of the shoes are connected by a toggle including corresponding links 40 and 42 pivotally connected to the shoes 28 and 30. These links extend through suitable slots in the rectangular portion 24 and are pivotally connected to each other to provide a knee 44. The pin connecting the links 42 also provides a suitable mounting for rollers 46 and 48 positioned on opposite sides of the knee and engaging the inner wall of the hollow rectangular portion 24. The pin further serves as a fulcrum for an operating lever 50.

The lever has upon its fulcrumed end a hook-shaped portion 52 extending through a slot in the wall of the rectangular portion 24, and connected to the force-applying end of the lever is a draft cable 54 extending through the knuckle pivot pin 12 to an operating means, not shown. The links 40 and 42 have formed upon their extreme ends suitable lugs 56 connected to a suitable bracket 58 on the fixed support 20 by return springs 60 and 62. The springs serve to return the shoes when the brake is released and to locate them against suitable stops on the arms 40 and 42.

The adjusting member 38 connected between the articulated ends of the shoes comprises an elongated polygonal-sided nut 64 in which are positioned right and left-hand threaded bolts 66 and 68. Each of the bolts has a lateral pin 70 and 72 passing transversely through the webs of the shoes. As shown, the pins 70 and 72 have positioned thereon on each side of the webs suitable washers 74 and 76, and positioned on the pins 70 and 72 between the washers 74 and 76 and washers 78 and 80 held on the pins by cotter pins are coil springs 82 and 84. These springs yield sufficiently to permit turning of the nut, which is made accessible through a suitable opening in the backing plate, and are sufficiently stiff to retain the nut in an adjusted position with one of its faces against the webs of the shoes to effectively lock the adjusting member against displacement.

In operation, force is applied to the cable 54 to actuate the lever 50. Since this lever is pivotally connected to the knee of the toggle, the applied force to the lever is transmitted to the toggle tending to straighten the arms thereof, whereupon the knee moves within the rectangular portion 24 of the arm 22, the rollers on the knee traveling on the inner wall of the rectangular portion 24. This causes movement of the friction element bodily to engage this element with the drum diametrically opposite the anchor. Thereafter the spreading of the toggle 40 causes the friction elements or shoes 28 and 30 to move further into drum engagement. Because of the connection of the toggle between the friction elements or shoes 28 and 30 and of the relation of the toggle to the torque arm 22, the toggle becomes both an applying means and an anchoring means for the shoes, and thus the anchor moves radially of the structure in the actuation of the brake.

Although this invention has been described in connection with certain specific embodiments, the principles involved are susceptible of numerous other applications that will readily occur to persons skilled in the art. The invention is, therefore, to be limited only as indicated by the scope of the appended claims.

The above-described novel applying and anchoring means is not claimed herein, having been divided herefrom on the requirement of the Patent Office, but is claimed in my partial-continuation application No. 694,543, filed October 21, 1933.

Having thus described the various features of the invention, what I claim as new and desire to secure by Letters Patent is:

1. An adjusting device comprising oppositely threaded screws, an elongated nut connecting the screws having polygonal sides, lateral pins connected to the screws and tension members on the pins.

2. A brake comprising a pair of friction elements having webs, oppositely threaded screws, an elongated nut connecting the screws having polygonal sides, lateral pins on the screws extending through the web and tension members on the pins.

3. A brake comprising a pair of shoes having webs, oppositely threaded screws connected to the webs, an elongated nut connecting the screws having polygonal faces adapted to engage the webs and means for yieldingly connecting the screws to the webs.

4. A brake comprising a pair of shoes having webs, oppositely threaded screws yieldingly connected to the respective webs and a nut connecting the shoes having flat surfaces adapted to bear against the webs.

WILLIAM J. ANDRES.